May 7, 1935.  W. D. SCHMIDT  2,000,476

TOOL SETTING GAUGE

Filed Dec. 14, 1931

Inventor
Wm. D. Schmidt
By Geo. H. Kennedy Jr.
Attorney

Patented May 7, 1935

2,000,476

UNITED STATES PATENT OFFICE 2,000,476

TOOL SETTING GAUGE

William D. Schmidt, Worcester, Mass., assignor to The Heald Machine Company, Worcester, Mass., a corporation of Massachusetts Application December 14, 1931, Serial No. 580,878

13 Claims. (Cl. 33—185)

The present invention relates to gauges and mechanism associated therewith for adjusting the cutting edge of a tool in relation to a supporting bar.

In the reduction of workpieces to exact predetermined desired size by cutting operations, as performed, for example, in boring machines, the amount of stock to be removed is often very small. The corresponding adjustments of the cutting tool beyond the axis of the supporting bar to obtain the desired cut must be also very small, and cannot be determined without the use of gauges. Furthermore, in the use of a tool, the cutting surface of which is a diamond, tungsten carbide, or similar material, said cutting surface is too small to permit adjustment of said surface for the desired shearing cut, without a suitable indicating means. The principal object of the present invention is accordingly to provide an accurate indicating means by which to indicate the distance which the cutting tool projects from the supporting bar, in connection with adjusting means for varying the extent of projection of the cutting tool beyond the surface of the bar and for varying the angularity of the cutting face to provide for a shearing cut.

According to the present invention, the supporting bar for the cutting tool is received in a groove in the instrument and is clamped therein. A gauge member engages the point of the cutting tool to indicate the distance which the cutting tool projects from the bar and the instrument carries means which engages with the cutting tool for changing the relative position of said cutting tool longitudinally thereof to cause said tool to project more or less beyond the surface of the supporting bar as indicated by said gauge, said means also providing for rotating the cutting tool parallel to its longitudinal dimension to vary the angularity of the cutting surface relative to the axis of the supporting bar to procure the desired shearing cut, as indicated by said adjusting means.

Other and further objects will appear from the following description taken in connection with the accompanying drawing in which:—

Like reference characters refer to like parts in the different figures.

Figure 5:
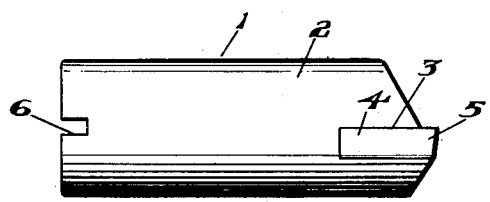
Fig. 5 is a side elevation of the cutting tool.
Figure 6:
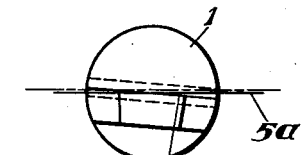
Fig. 6 is a front elevation of the tool showing the angularity of the cutting surface for the shearing cut.
Figure 4:
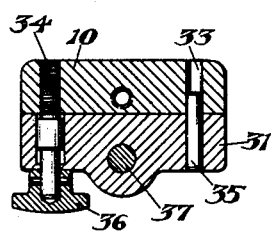
Fig. 4 is a sectional view along the line 4—4 of Fig. 2.

Referring first to Figs. 5 and 6, the cutting tool 1 comprises a cylindrical member 2 having a slot 3 at one end in which a hard cutting nib 4, either a diamond or a similar hard substance, is mounted. Said nib provides a cutting edge 5 which, as best shown in Fig. 6 extends at a slight angle to the center line 5a of the work to provide the desired shearing cut. The end of the member 2 remote from the cutting nib has a slot 6 therein which extends exactly parallel to the cutting edge 5, to indicate the angularity of said edge, as will hereinafter appear. The tool 1 is mounted in a cylindrical supporting bar 7, Fig. 2, and extends through said bar substantially perpendicularly to the axis thereof, the cutting nib projecting beyond the periphery of said bar, and being held in position by a set screw 8 which is mounted in the supporting bar and engages said tool.

Figure 2:
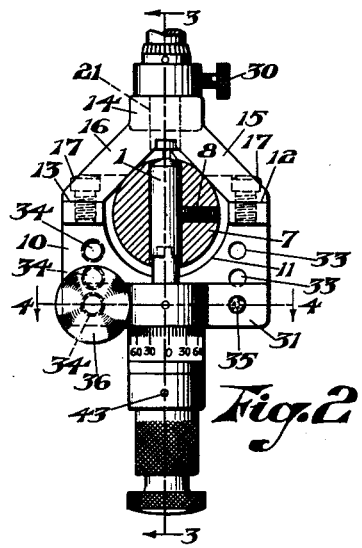
Fig. 2 is a front elevation view of the instrument of Fig. 1, with a cutting tool and supporting bar in position therein.
Figure 1:
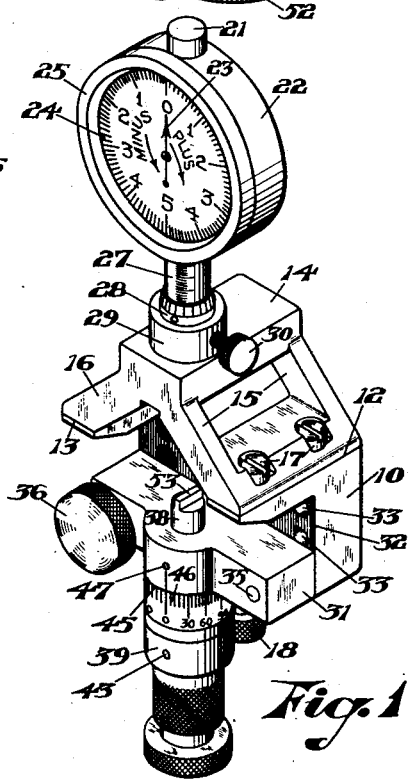
Fig. 1 is a perspective view of an instrument embodying the invention.

Referring now to Figs. 1 and 2, the instrument embodying the invention comprises a base 10 having a semicircular cutout portion 11, Fig. 2, centrally of the upper edge thereof, the opposite ends of the upper edge of said base, beyond the cutout, providing flat surfaces 12 and 13 extending perpendicularly to the plane of the semi-circular cutout. A gauge supporting member 14 provides downwardly extending legs 15 and 16, the ends of which engage the flat surfaces 12 and 13 of the base 10 and are secured thereto by screws 17. As best shown in Fig. 2, the legs 15 and 16 extend at right angles to each other to provide a V-shaped groove, the outer ends of which coincide with the ends of the semi-circular cutout portion forming an opening in the instrument for the reception of the supporting bar 7, said bar being clamped into the V-shaped groove by a clamping screw 18, Fig. 3, extending through and adjustable in a threaded bore 19 in the base. A bearing 20 is provided in the member 14 for the reception of the plunger 21 of a gauge 22 which is mounted on said member 14, the plunger extending into the V-shaped groove. The gauge 22 is of the usual indicator type and provides a pivotally mounted needle 23 rotatable in response to vertical movement of the plunger 21, the movements of said needle being indicated on a graduated dial 24 secured to a bezel 25, said dial being rotatable by said bezel to bring the zero indication on the dial into position directly in back of the needle point when said plunger 21 is in position to indicate the proper location of the cutting tool beyond the surface of the supporting bar, as will hereinafter appear. The upper end of the plunger extends beyond the periphery of the gauge to permit said plunger to be moved manually into engagement with the tool in the V-shaped groove, a spring, not shown, normally maintaining said plunger in raised position.

The gauge with the plunger therein is adjustable toward and away from the supporting member 14 to adjust the position of the plunger to different diameters of supporting bars and for varying distances which the cutting tool projects beyond the surface of the supporting bar. As shown in Fig. 1, the plunger 21 of the gauge is slidable within a gauge stem 27 which is graduated and which is rotatably mounted in a graduated sleeve 28, the latter being secured to a collar 29 on the gauge supporting member 14. The gauge stem and sleeve have cooperating portions provided with inner engaging screw threads, and rotation of the gauge and stem in the sleeve thus procures vertical movement of the gauge relative to the supporting member 14, the extent of movement being indicated by the cooperating graduations on the stem and sleeve. The gauge is locked in adjusted position by a thumb screw 30 which extends through the collar 29 into engagement with the gauge stem 27.

Figure 3:
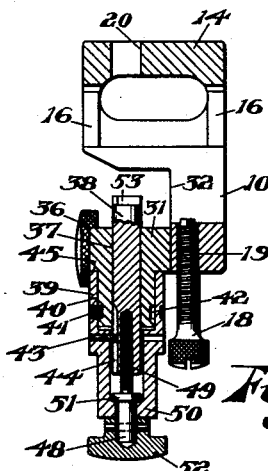
Fig. 3 is a vertical section along the line 3—3 of Fig. 2, the cutting tool, supporting bar and gauge being removed.

As above stated, the instrument is constructed to permit adjustment of the cutting tool to cause the cutting surface to project a greater or less distance beyond the surface of the cutting bar as indicated by the gauge. To this end, a block 31 is provided on the front surface of the base 10 which, as shown in Figs. 1 and 3, provides a plane surface 32 with which said block 31 engages. The base 10 has a plurality of spaced bores 33 adjacent one vertical edge and similarly spaced threaded bores 34 adjacent the opposite vertical edge, a dowel pin 35 which is mounted adjacent one end of the block 31 engaging selectively with any one of the spaced bores 33 and a clamping screw 36 which extends through the opposite end of the block 31 engaging selectively with any one of the threaded bores 34, whereby the block 31 is firmly secured in position on the front of the base 10.

The block 31 has a vertical bore 37 therein, Fig. 3, in alignment with the plunger 21 of the gauge, said bore receiving a plunger 38 vertically movable therein. As best shown in Fig. 3, a sleeve 39 is rotatably mounted on a depending cylindrical portion 40 of the block 31 and is secured against vertical movement on said block by a key 41 which engages a circular keyway 42 in said portion 40. A pin 43 extends through said sleeve into engagement with a longitudinal keyway 44 in the plunger 38 to procure turning movement of the plunger in unison with the sleeve, said turning movement operating to adjust the angularity of the cutting surface of the tool, as will hereinafter appear. The upper end of the sleeve 39 engages a shoulder 45 on the supporting block and is graduated as shown at 46 to indicate, in cooperation with an indicating mark 47 on the block 31, the angular adjustment of said plunger 38 and accordingly the angular adjustment of the tool in the supporting bar.

The plunger 38 is vertically adjustable in the block 31 by an adjusting screw 48 which engages a threaded bore 49 in the lower end of said plunger, said screw being held against vertical movement relative to the sleeve by an inturned shoulder 50 on said sleeve which engages between a collar 51 and the head 52 of the screw 48. Rotation of said screw 48 thus procures vertical movement of the plunger 38 and accordingly projects the cutting tool to a greater or less extent beyond the axis of the supporting bar.

In the use of the instrument, the supporting bar with the cutting tool therein, as above described, is clamped by the screw 18 in the opening in the instrument, as shown in Fig. 2, said clamping screw urging the supporting bar into the V-shaped groove, with the cutting edge of the tool directly beneath the plunger 21. The end of the tool remote from the cutting edge is engaged by the upper end of the plunger 38 which latter is provided with a tongue 53 on its upper end for engagement with the slot 6 in said cutting tool.

The plunger 38 is in axial alinement with the gauge plunger 21 and it will be apparent that with the groove 6 in the cutting tool engaged by a tongue 53 of the plunger 38, and with the cutting edge of the tool in engagement with the end of the plunger 21, the supporting bar 7 is necessarily properly alined within the instrument with the axis of the cutting tool 2 coinciding with the axes of the plungers 38 and 21, the supporting bar being then clamped in the base of the groove provided by the instrument will be properly positioned therein for accurate gaging of the extent to which the cutting edge of the tool projects beyond the axis of the supporting bar.

Since the tongue 53 extends diametrically of the plunger 38 and the center line of the tongue is parallel to a diameter through said plunger which, if extended, would intersect the zero graduation on the sleeve, it will be apparent that, when the zero indication on the sleeve corresponds with the indicating mark on the supporting block, the cutting edge of the tool will be in precise parallel relation to the axis of the supporting bar. Rotation of the sleeve to any desired angle as indicated by the graduations on said sleeve will rotate the cutting edge through a corresponding angle to provide a shearing cut when the tool is in operation.

The gauge having been set to the proper adjusted position to indicate the desired projection of the cutting edge beyond the supporting bar, the tool is moved radially by raising or lowering the plunger 38 by rotation of the adjusting screw until the indicating needle on the gauge is brought to its zero position, the plunger in the gauge being held manually in engagement with the tool. The cutting edge having been properly adjusted for radial projection from the axis of supporting bar and for angularity of the cutting edge relative to said axis, the set screw 8 is tightened to clamp the cutting tool in its adjusted position.

In the adjustment of the gauge to indicate the proper radial projection of the cutting tool from the axis of the supporting bar, it will be noted that rotation of the gauge and stem in the supporting member 14 will raise or lower the plunger 21 relative to the base of the V-shaped groove to procure the proper adjustment as indicated by the cooperating graduations on said stem and collar, and finer adjustments are procured by rotation of the dial of the gauge by means of the bezel to which said dial is secured. The proper radial adjustment of the cutting tool having once been procured, the setting of the instrument is desirably transferred to a master bar so that the same tool adjustment may be later obtained by first setting the instrument to proper position by reference to said master bar.

From the foregoing, it will be apparent that, by the instrument embodying the present invention, the cutting edge of a tool is adjusted radially of the supporting bar and also the angularity of the cutting edge is adjusted relative to axis of the supporting bar, said instrument indicating both the angular and radial adjustments. It will also be noted that the instrument is adjustable to receive various sizes of supporting bars by raising or lowering the block 31, a plurality of adjustments being provided for this purpose. The instrument is adjusted to indicate various radial adjustments by raising or lowering the plunger of the gauge by rotation of said gauge and gauge stem in the gauge supporting member 14, said gauge being securely held in its adjusted position. With the block 31 removed, the instrument becomes a comparator to indicate the proper radial adjustment of the tool in the supporting bar.

I claim,

1. In a device for adjusting a cutting tool in a supporting bar, a frame, means on said frame for clamping said device to said bar, means on said frame in a predetermined relation to the clamping means and engageable with one end of said cutting tool for indicating the extent of projection of the cutting edge of said cutting tool radially beyond the axis of said bar, means on said frame in predetermined relation to said indicating means and engageable with the other end of said cutting tool for adjusting said cutting tool radially in said bar, and means on said frame for adjusting the angularity of the cutting edge of said tool relative to the axis of said supporting bar.

2. In a device for adjusting a cutting tool on a supporting bar, a frame, means on said frame for clamping said bar in predetermined position in said device, means on said frame in predetermined relation to said clamping means and engageable with one end of said cutting tool for indicating the radial extent of projection of said tool beyond the axis of said bar, and means on said frame in predetermined relation to said indicating means and engageable with the other end of said tool for adjusting said tool radially in said bar.

3. In a device for adjusting a cutting tool in a supporting bar, a frame having a groove in which said bar is adapted to be clamped, means carried by said frame, including a member positioned in the base of said groove and engageable with one end of the tool, for indicating the extent of projection of said tool radially beyond the axis of said bar, and means carried by the frame in predetermined relation to said indicating means and engageable with the other end of the tool for adjusting the extent of the radial projection of said cutting tool.

4. In a device for adjusting a cutting tool in a supporting bar, a frame having a groove in which said bar is adapted to be clamped, means carried by said frame, including a member positioned in the base of said groove and engageable with one end of said tool, for indicating the extent of projection of said tool radially beyond the axis of said bar, means in predetermined relation to said indicating means and engageable with the other end of said tool for adjusting the extent of the radial projection of said cutting tool, and means carried by said frame and cooperating with the radial adjustment means for indicating the angularity of the cutting edge of said tool relative to the axis of the supporting bar independently of the radial movement of said tool in said bar.

5. In a device for adjusting a cutting tool in a supporting bar, a frame having a groove in which said bar is adapted to be clamped, means carried by said frame, including a member positioned in the base of said groove and engageable with one end of said tool, for indicating the extent of projection of said tool radially beyond the axis of said bar, means in predetermined relation to said indicating means and engageable with the other end of said tool for adjusting the extent of the radial projection of said cutting tool, and means carried by the frame and cooperating with the radial adjustment means for adjusting the angularity of the cutting edge of the tool relative to the supporting bar without radial movement of said tool in said bar.

6. In a device for adjusting a cutting tool in a supporting bar, a frame having a groove in which said bar is adapted to be received, means for clamping said bar positively in said groove, means carried by said frame, including a member positioned in the base of said groove and engageable with one end of said tool, for indicating the extent of projection of said tool radially beyond the axis of the supporting bar, and means in predetermined relation to said indicating means and engageable with the other end of said tool for adjusting the extent of the radial projection of said cutting tool, said indicating means being adjustable to indicate greater or less distances of radial projection of said tool from the axis of said bar.

7. In a device for adjusting a cutting tool in a supporting bar, a frame having a groove in which said bar is received, means for clamping said bar in said groove, means carried by said frame, including a member positioned in the base of said groove and engageable with one end of said cutting tool for indicating the extent of projection of said tool radially from the axis of the supporting bar, means in predetermined relation to said indicating means and engageable with the other end of said tool for adjustment of the extent of the radial projection of said cutting tool, means cooperating with said adjusting means to indicate and to adjust the angularity of the cutting edge relative to the supporting bar, said first indicating means and said first adjusting means being adjustable to accommodate various sizes of supporting bars and to indicate greater or less distances of radial projection of said tool from the axis of said bar.

8. In a device for adjusting a cutting tool in a supporting bar, a frame having a groove in which said bar is adapted to be received, means on said frame for clamping said bar positively in said groove, means carried by the frame, including a member positioned in the base of said groove and engageable with one end of said tool for indicating the extent of projection of said tool radially from the axis of the supporting bar, and means in predetermined relation to said indicating means and engageable with the other end of said tool for adjusting the extent of the radial projection of said tool beyond the axis of the supporting bar, said indicating means being adjustable to indicate greater or less distances of radial projection of said tool from the axis of said bar and said adjusting means being adjustable toward or away from said groove for accommodating various sizes of supporting bars.

9. In a device for adjusting a cutting tool in a supporting bar, a frame, means on said frame for clamping said bar in predetermined position in said device, a plunger on said frame in predetermined relation to said clamping means and engageable with one end of said tool, said plunger having means to prevent relative angular movement between said plunger and the tool, means carried by said frame for adjusting said plunger angularly to vary the angularity of the cutting edge of said tool relative to the supporting bar without radial movement of said tool in said bar, and cooperating means on the frame, and adjusting means for indicating the extent of the angular adjustment.

10. In a device for adjusting a cutting tool in a supporting bar, a frame, means on said frame for clamping said bar in predetermined position in said device, a plunger on said frame in predetermined relation to said clamping means and engageable with one end of said tool, said plunger having means to prevent relative angular movement between said plunger and the tool, means carried by said frame for adjusting said plunger angularly to vary the angularity of the cutting edge of said tool relative to the supporting bar without radial movement of said tool in said bar, cooperating means on the frame and adjusting means for indicating the extent of the angular adjustment, and means carried by the frame for adjusting said plunger longitudinally to vary the extent of projection of said cutting tool radially of the supporting bar, said longitudinal adjustment means being independent of said angular adjustment means for said plunger.

11. In a device for adjusting a cutting tool in a supporting bar, a frame having a groove in which said bar is adapted to be received, means on the frame for clamping said bar in said groove, a plunger having a tongue engageable with a slot in one end of the cutting tool, means carried by the frame for adjusting said plunger longitudinally without angular turning movement thereof for adjusting the cutting tool radially in the supporting bar, means carried by the frame for adjusting said plunger angularly without longitudinal movement thereof for adjusting the angularity of the cutting edge of said tool relative to the axis of the supporting bar, and cooperating means carried by the frame and the angular adjustment means for indicating the angularity of the cutting edge of the tool relative to the axis of the bar.

12. In a device for adjusting a cutting tool in a supporting bar, a frame having a groove in which said bar is adapted to be received, means carried by the frame for positively clamping said supporting bar in said groove, means carried by the frame, including a member positioned in the base of said groove and engageable with one end of the cutting tool, for indicating the extent of projection of said tool radially beyond the axis of the supporting bar, a plunger carried by the frame and having a tongue engageable with a slot in one end of the cutting tool, means carried by the frame for adjusting said plunger longitudinally without angular turning movement thereof for adjusting the cutting tool radially in a supporting bar, means carried by the frame for adjusting said plunger angularly without longitudinal movement thereof for adjusting the angularity of the cutting edge of said tool relative to the axis of the supporting bar, and cooperating means on the frame and the angular adjustment means for indicating the angular position of the tongue on said plunger, thereby indicating the angularity of the cutting edge of the tool relative to the axis of the bar.

13. In a device for adjusting a clamping tool in a supporting bar, a frame having a groove therein in which said bar is adapted to be received, means on the frame for positively clamping said bar in said groove, means carried by the frame, including a member positioned in the base of the groove and engageable with one end of the cutting tool, for indicating the extent of the protection of said tool radially from the axis of the supporting bar, said indicating means being adjustable in said frame for indicating greater or less distances of radial projection of said tool from the axis of said bar, a plunger supported by the frame and having a tongue engageable with a slot in one end of the cutting tool, means provided by the frame for adjusting said plunger longitudinally relative to said frame without angular movement of said plunger, thereby adjusting the cutting tool radially within the supporting bar, means provided by the frame for adjusting said plunger angularly relative to said frame without longitudinal movement of said plunger, thereby adjusting the angularity of the cutting edge of said tool relative to the axis of the supporting bar, and cooperating means on the frame and the angular adjustment means for indicating the angular position of the tongue on said plunger, thereby indicating the angularity of the cutting edge of the tool relative to the axis of the bar.

WILLIAM D. SCHMIDT.